US008923923B2

(12) United States Patent
Xiong et al.

(10) Patent No.: US 8,923,923 B2
(45) Date of Patent: Dec. 30, 2014

(54) MULTI-FREQUENCY BAND ANTENNA FEEDER SHARING METHOD AND BASE STATION RADIO FREQUENCY UNIT

(71) Applicant: Huawei Technologies Co., Ltd., Shenzhen (CN)

(72) Inventors: Liqun Xiong, Shenzhen (CN); Dong Zhao, Shenzhen (CN); Bin Li, Hampshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/774,440

(22) Filed: Feb. 22, 2013

(65) Prior Publication Data

US 2013/0171948 A1 Jul. 4, 2013

Related U.S. Application Data

(63) Continuation of application No. PCT/CN2011/083787, filed on Dec. 9, 2011.

(51) Int. Cl.
  *H04B 1/38* (2006.01)
  *H04B 1/50* (2006.01)

(52) U.S. Cl.
  CPC . *H04B 1/50* (2013.01); *H04B 1/057* (2013.01)
  USPC .................. 455/561; 455/73; 455/78; 455/83; 455/562.1

(58) Field of Classification Search
  CPC ........... H04B 1/50; H04B 88/08; H04B 88/10
  USPC ............. 455/73, 78, 83, 561, 562.1, 306, 307
  See application file for complete search history.

(56) References Cited

U.S. PATENT DOCUMENTS 6,148,175 A * 11/2000 Freedland .................... 455/3.06
2011/0122831 A1 5/2011 Kim et al.

FOREIGN PATENT DOCUMENTS

| CN | 1905706 A | 1/2007 |
| CN | 2865168 Y | 1/2007 |
| CN | 201018482 Y | 2/2008 |
| CN | 101183894 A | 5/2008 |
| CN | 101600269 A | 12/2009 |

(Continued)

OTHER PUBLICATIONS

International Search Report and Written Opinion of the International Searching Authority issued in corresponding PCT Patent Application No. PCT/CN2011/083787, mailed Sep. 13, 2012.

*Primary Examiner* — Tuan Pham
(74) *Attorney, Agent, or Firm* — Brinks Gilson & Lione

(57) ABSTRACT

Embodiments of the present disclosure provide a multi-frequency band antenna feeder sharing method and a base station radio frequency unit. The method includes: receiving a signal of a frequency band 1 and a signal of a frequency band 2 through an antenna feeder, transmitting the signals to a band-pass filter and filtering the signals so as to obtain the signal of the frequency band 2, and transmitting the signal of the frequency band 2 to a third radio frequency port through a combiner port; and/or, sending the signal of the frequency band 2 to the combiner port through the third radio frequency port, transmitting the signal of the frequency band 2 that has passed through the band-pass filter to the port of the first radio frequency channel, and sending out the signal of the frequency band 2, together with the signal of the frequency band 1.

8 Claims, 17 Drawing Sheets

(56) References Cited

FOREIGN PATENT DOCUMENTS

| EP | 2278721 A1 | 1/2011 |
| KR | 1999-0061203 | 7/1999 |
| KR | 100312302 B1 | 10/2001 |
| WO | WO 2008/086515 A1 | 7/2008 |

* cited by examiner

When a first radio frequency module works in a set-in combiner mode, a second radio frequency port of the first radio frequency module receives a signal of a frequency band 1 and a signal of a frequency band 2 through a antenna feeder connected thereto. The signals of the frequency band 1 and the frequency band 2 pass through a band-pass filter built in the first radio frequency module so as to obtain the signal of the frequency band 2. Transmit the signal of the frequency band 2 to a third radio frequency port of a second radio frequency module through a combiner port
  — 1701

When the second radio frequency module sends the signal of the frequency band 2, the signal of the frequency band 2 is sent to the combiner port of the first radio frequency module through the third radio frequency port and the signal passes through the band-pass filter connected to the combiner port, the signal of the frequency band 2 passes through the second radio frequency port connected to the band-pass filter, and the signals of the frequency band 1 and the frequency band 2 are sent out through the antenna feeder
  — 1702

FIG. 17

MULTI-FREQUENCY BAND ANTENNA FEEDER SHARING METHOD AND BASE STATION RADIO FREQUENCY UNIT

CROSS-REFERENCE TO RELATED APPLICATIONS

This application is a continuation of International Application No. PCT/CN2011/083787, filed on Dec. 9, 2011, which is hereby incorporated by reference in its entirety.

FIELD

The present disclosure relates to the field of base station technologies, and in particular, to a multi-frequency band antenna feeder sharing method and a base station radio frequency unit.

BACKGROUND

With the development of radio communication, radio spectrum resources are increasingly tight, and it is increasingly popular that multiple frequency bands share a station, which requires adding an extra antenna feeder system. Therefore, various multi-frequency band shared antenna feeder technologies emerge accordingly.

During the implementation of the present disclosure, the inventors find that, in the prior art, multi-frequency band combination and antenna feeder sharing may be implemented through a set-in combiner. As shown in FIG. 1, a radio frequency module (RF Module) of a frequency band 2 implements combination of the two frequency bands and antenna feeder sharing through a set-in combiner of an RF Module of a frequency band 1, where "TX/RX1" and "RX2" are the sending and receiving ports on the RF Module of the frequency band 1, and they are connected to the antenna feeder. A "combining port" is a dedicated combiner port set on the RF Module of the frequency band 1, and such port is used to combine the frequency band 1 and the frequency band 2. Ports "TX/RX" and "RX" on the RF Module of the frequency band 2 performs signal sending and receiving on the combined signals of the frequency band 1 and the frequency band 2 through the "TX/RX1" and "RX2" ports on the RF Module of the frequency band 1 by using the combiner port and a band-pass filter. However, the dedicated combiner port set on the RF Module brings an extra cost overhead, and when the RF Module is not working in combiner mode, the dedicated combiner port is idle, and port resources are wasted.

SUMMARY

Embodiments of the present disclosure provide a multi-frequency band antenna feeder sharing method and a base station radio frequency unit, so as to simplify design of a set-in module, reduce a cost overhead of a module, and improve a utilization rate of a port.

To achieve the foregoing object, the present disclosure adopts the following technical solutions:

A radio frequency module, including: a band-pass filter, set between a port of a first radio frequency channel and a port of a second radio frequency channel in a base station radio frequency module; where the band-pass filter is set in the base station radio frequency module.

A base station radio frequency unit, including: a first radio frequency module and a second radio frequency module, where a port of the second radio frequency channel serving as a combiner port in the first radio frequency module is connected to a port of a third radio frequency channel in the second radio frequency module.

A multi-frequency band antenna feeder sharing method, including: when a first radio frequency module works in set-in combiner mode, receiving, through an antenna feeder connected to a port of a first radio frequency channel, a signal of a frequency band 1 and a signal of a frequency band 2 from the port of the first radio frequency channel of the first radio frequency module, transmitting the signals of the frequency band 1 and the frequency band 2 to a band-pass filter set in the first radio frequency module and filtering the signals so as to obtain the signal of the frequency band 2, and transmitting the signal of the frequency band 2 to a port of a third radio frequency channel of the second radio frequency module through a port of a second radio frequency channel serving as a combiner port in the first radio frequency module; and/or when the first radio frequency module works in set-in combiner mode, sending, by the second radio frequency module, the signal of the frequency band 2 to the port of the second radio frequency channel serving as a combiner port in the first radio frequency module through the port of the third radio frequency channel of the second radio frequency module, transmitting the signal of the frequency band 2 that has passed through the band-pass filter connected to the port of the second radio frequency channel to the port of the first radio frequency channel of the first radio frequency module, and sending out the signal of the frequency band 2, together with the signal of the frequency band 1, through an antenna feeder connected to the port of the first radio frequency channel.

In the multi-frequency band antenna feeder sharing method and the base station radio frequency unit provided by the embodiments of the present disclosure, the band-pass filter of the frequency band 2 is set in the radio frequency module of the frequency band 1, the combiner port and the port of the radio frequency channel in the radio frequency module are shared, thereby implementing antenna feeder sharing of two frequency bands. Embodiments of the present disclosure solve the problem of extra cost overhead brought by the dedicated combiner port that is set, and port resources waste brought when the dedicated combiner port is idle in the prior art, simplify the design of the set-in module, reduce the cost overhead of the module, and improve the utilization rate of the port.

BRIEF DESCRIPTION OF THE DRAWINGS

FIG. 17 is a schematic diagram of main operations of a multi-frequency band antenna feeder sharing method provided by Embodiment 2 of the present disclosure.

DETAILED DESCRIPTION OF THE EMBODIMENTS

Figure 1:
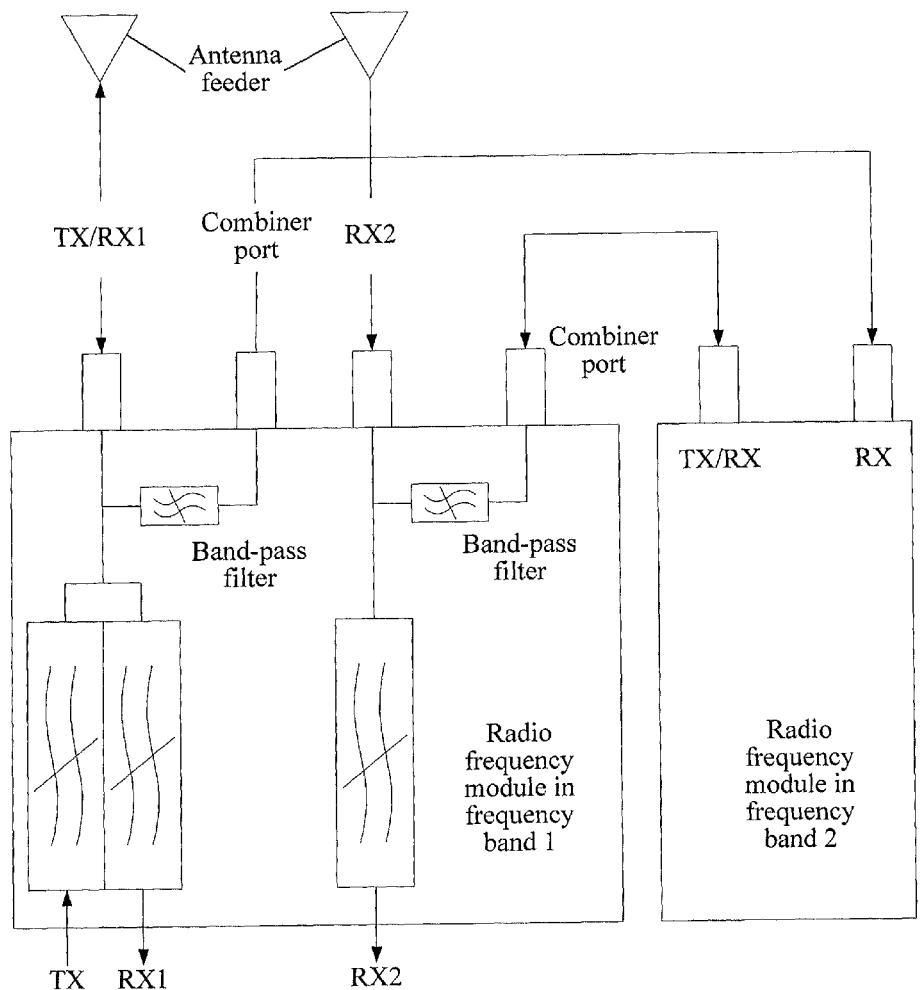
FIG. 1 is a schematic diagram of a set-in combiner technology in the prior art.

As used herein, the term "and/or" includes any and all combinations of one or more of the associated listed items. A multi-frequency band antenna feeder sharing method and a base station radio frequency unit are described in detail in embodiments of the present disclosure with reference to the accompanying drawings in the following.

Embodiment 1

An embodiment of the present disclosure provides a radio frequency module, including: a band-pass filter, set between a port of a first radio frequency channel and a port of a second radio frequency channel in a base station radio frequency module; where the band-pass filter is set in the base station radio frequency module.

In the radio frequency unit provided by the embodiment of the present disclosure, the band-pass filter is set between the port of the first radio frequency channel and the port of the second radio frequency channel of the base station radio frequency module, and the band-pass filter is set in the base station radio frequency module, the port of the second radio frequency channel, serving as the combiner port, is connected to the port of the radio frequency channel in another base station radio frequency module, thereby implementing antenna feeder sharing of two frequency bands. Embodiments of the present disclosure solve the problem of extra cost overhead brought by the dedicated combiner port that is set, and port resources waste brought when the dedicated combiner port is idle in the prior art, simplify the design of the set-in module, reduce the cost overhead of the module, and improve the utilization rate of the port.

The port of the first radio frequency channel in the radio frequency module is connected to an antenna feeder or an indoor distribution system.

An embodiment of the present disclosure further provides a base station radio frequency unit, including: a first radio frequency module and a second radio frequency module, where a port of the second radio frequency channel serving as a combiner port in the first radio frequency module is connected to a port of a third radio frequency channel in the second radio frequency module.

The base station radio frequency unit provided by the embodiment of the present disclosure includes the first radio frequency module and the second radio frequency module, and the port of the second radio frequency channel serving as a combiner port in the first radio frequency module is connected to the port of the third radio frequency channel in the second radio frequency module, thereby implementing antenna feeder sharing of two frequency bands. Embodiments of the present disclosure solve the problem of extra cost overhead brought by the dedicated combiner port that is set, and port resources waste brought when the dedicated combiner port is idle in the prior art, simplify the design of the set-in module, reduce the cost overhead of the module, and improve the utilization rate of the port.

In specific implementation, when the first radio frequency module is to be in set-in combiner mode, the port of the radio frequency channel of the first radio frequency module serves as the combiner port.

Figure 2:
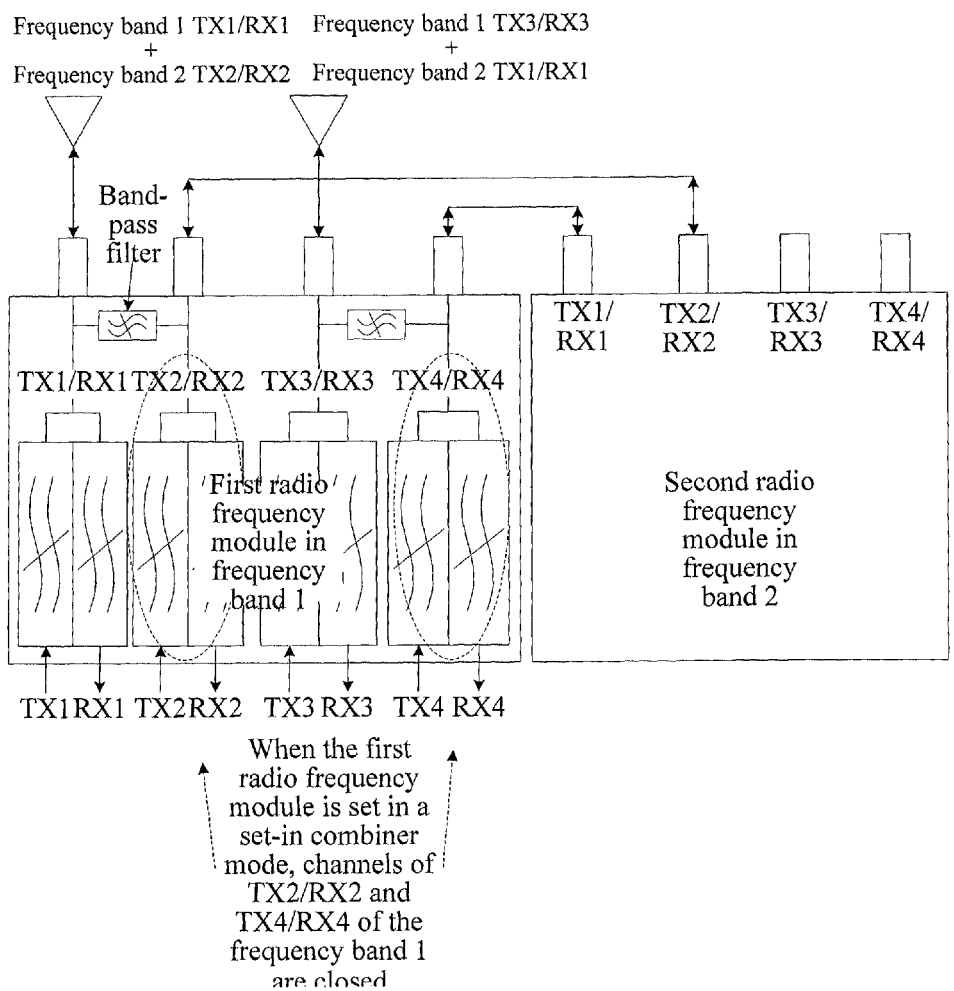
FIG. 2 is a schematic diagram of a base station radio frequency unit provided by Embodiment 1 of the present disclosure, where a first radio frequency module and a second radio frequency module are both a radio frequency module having 4 transmitting channels and 4 receiving channels.

As shown in FIG. 2, the base station radio frequency unit comprises two radio frequency modules, each having 4 transmitting channels and 4 receiving channels, namely, a first radio frequency module and the second radio frequency module. Channels of TX2/RX2 and TX4/RX4 of the first radio frequency module in the figure are closed. Ports of two radio frequency channels serve as the combiner ports, and are connected to TX2/RX2 and TX1/RX1 of the second radio frequency module, respectively. Channels of TX1/RX1 and TX3/RX3 of the first radio frequency module are in an enabled state, the ports of two radio frequency channels are connected to the two combiner ports through the band-pass filter, respectively; and TX1/RX1 and TX3/RX3 ports of the first radio frequency module are connected to the antenna feeder.

Figure 3:
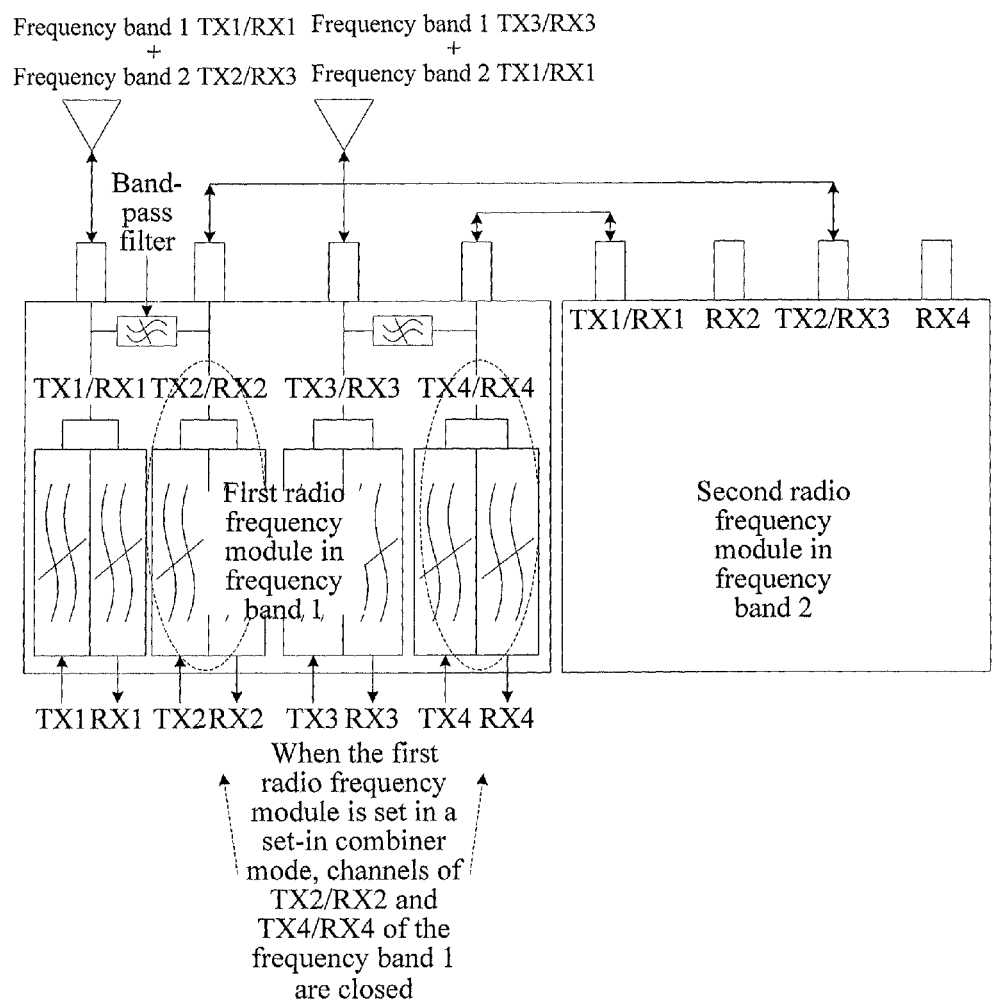
FIG. 3 is a schematic diagram of a base station radio frequency unit provided by Embodiment 1 of the present disclosure, where a first radio frequency module has 4 transmitting channels and 4 receiving channels, and a second radio frequency module has 2 transmitting channels and 4 receiving channels.

As shown in FIG. 3, the second radio frequency module may still be a radio frequency module having 2 transmitting channels and 4 receiving channels, and ports TX1/RX1 and TX2/RX3 of the radio frequency channel in the second radio frequency module are connected to the combiner port of the first radio frequency module.

Figure 4:
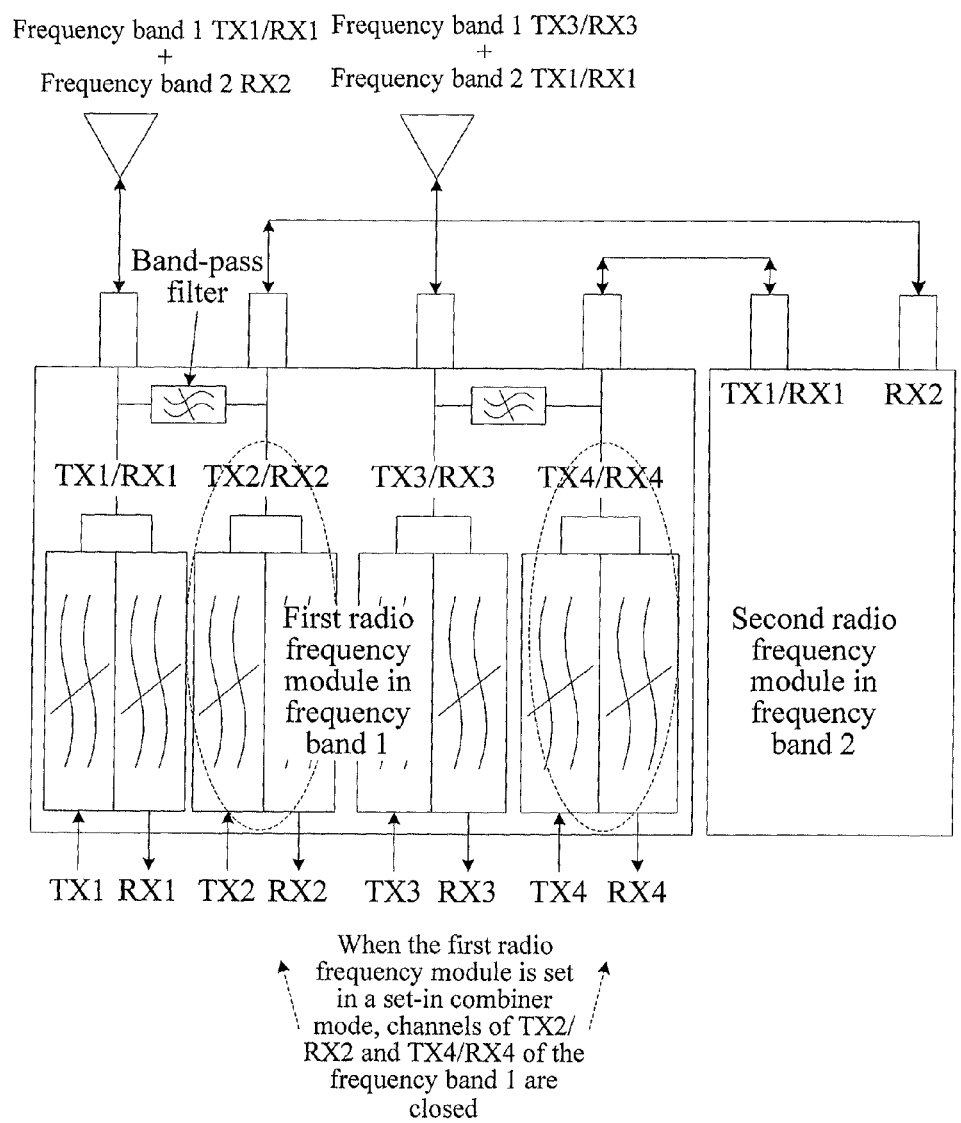
FIG. 4 is a schematic diagram of a base station radio frequency unit provided by Embodiment 1 of the present disclosure, where a first radio frequency module has 4 transmitting channels and 4 receiving channels, and a second radio frequency module is has 1 transmitting channel and 2 receiving channels.

As shown in FIG. 4, the second radio frequency module may still be a radio frequency module having 1 transmitting channel and 2 receiving channels, and ports TX1/RX1 and RX2 of the radio frequency channel in the second radio frequency module are connected to the combiner port of the first radio frequency module.

Figure 5:
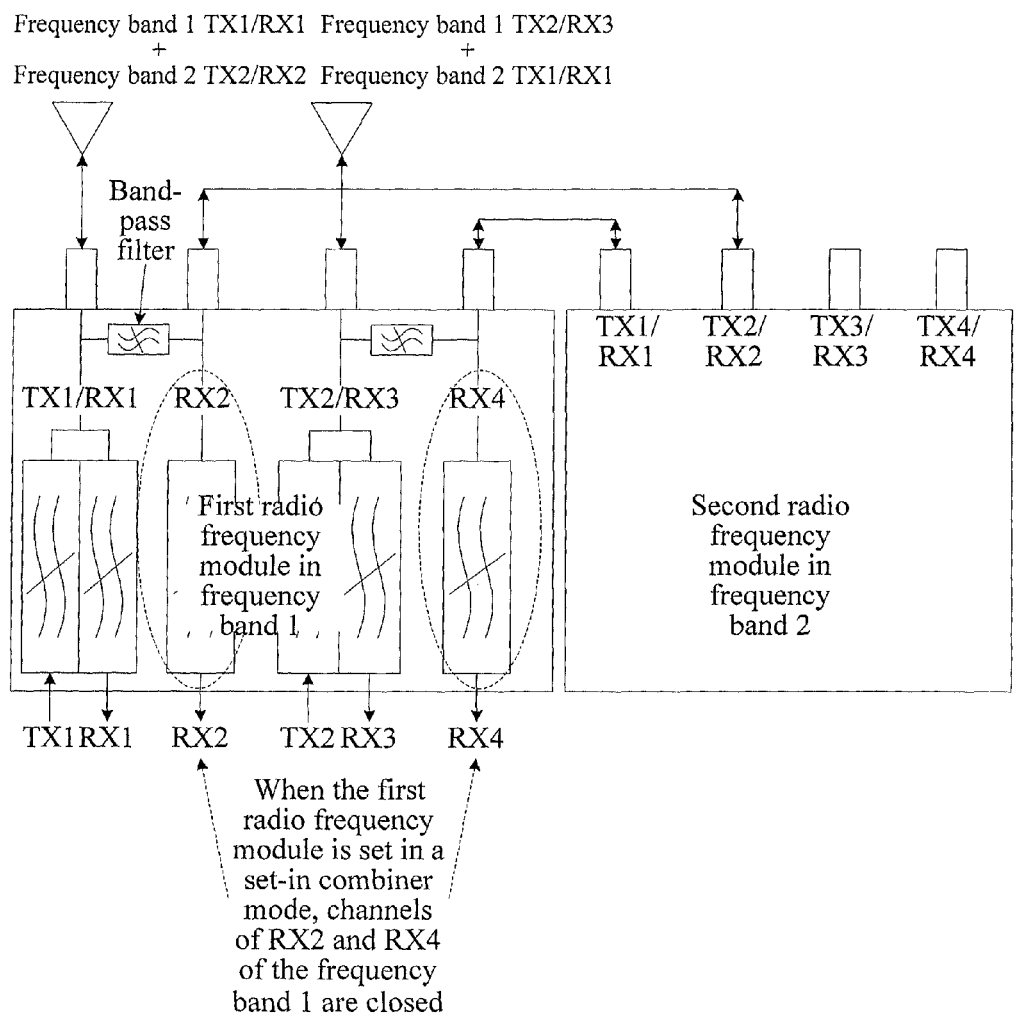
FIG. 5 is a schematic diagram of a base station radio frequency unit provided by Embodiment 1 of the present disclosure, where a first radio frequency module is has 2 transmitting channels and 4 receiving channels, and a second radio frequency module has 4 transmitting channels and 4 receiving channels.

As shown in FIG. 5, the first radio frequency module may be a radio frequency module having 2 transmitting channels and 4 receiving channels, where channels of RX2 and RX4 are closed. Ports of two radio frequency channels, serving as the combiner ports, are connected to ports of two radio frequency channels of a second radio frequency module having 4 transmitting channels and 4 receiving channels, respectively. Channels of TX1/RX1 and TX2/RX3 of the first radio frequency module are in an enabled state, ports of two radio frequency channels are connected to the two combiner ports through the band-pass filter, respectively; and TX1/RX1 and TX2/RX3 ports of the first radio frequency module are connected to the antenna feeder.

Figure 6:
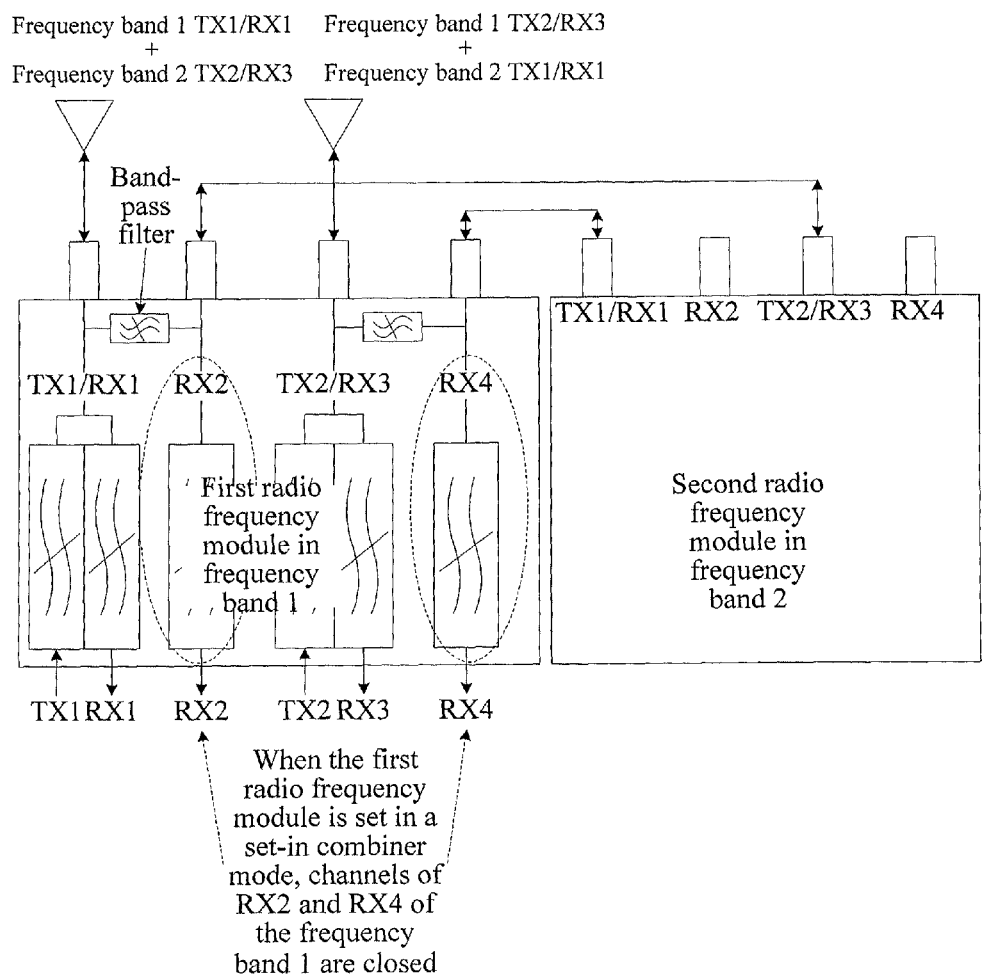
FIG. 6 is a schematic diagram of a base station radio frequency unit provided by Embodiment 1 of the present disclosure, where a first radio frequency module has 2 transmitting channels and 4 receiving channels, and a second radio frequency module has 2 transmitting channels and 4 receiving channels.

The first radio frequency module shown in FIG. 6 still is a radio frequency module having 2 transmitting channels and 4 receiving channels, and the second radio frequency module may also be the radio frequency module having 2 transmitting channels and 4 receiving channels, RX2 and RX4 in the first radio frequency module, serving as the combiner ports, are connected to TX1/RX1 and TX2/RX3 of the second radio frequency module, respectively.

Figure 7:
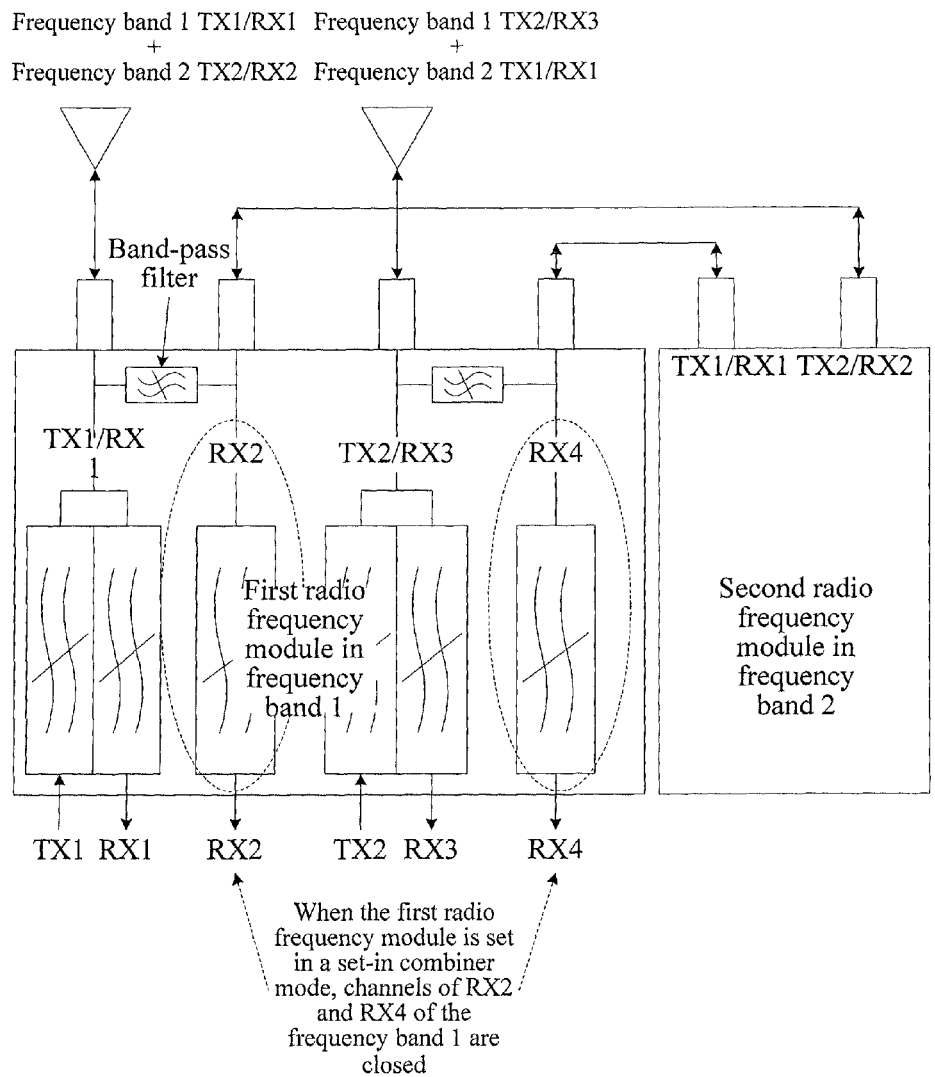
FIG. 7 is a schematic diagram of a base station radio frequency unit provided by Embodiment 1 of the present disclosure, where a first radio frequency module has 2 transmitting channels and 4 receiving channels, and a second radio frequency module has 2 transmitting channels and 2 receiving channels.

The second radio frequency module shown in FIG. 7 may still be a radio frequency module having 2 transmitting channels and 2 receiving channels, and ports TX1/RX1 and TX2/RX2 of the radio frequency channel in the second radio frequency module are connected to the combiner ports of the first radio frequency module respectively.

Figure 8:
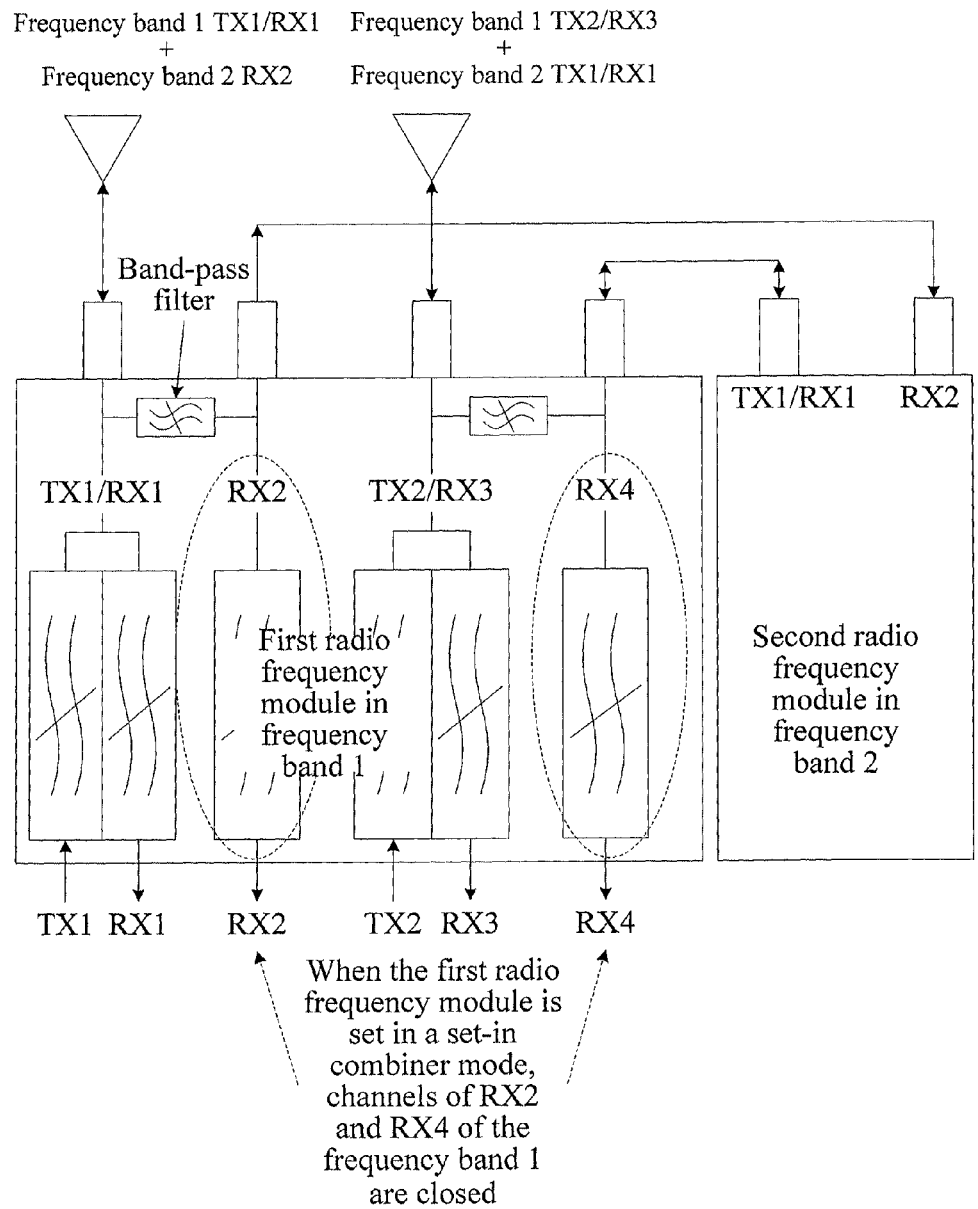
FIG. 8 is a schematic diagram of a base station radio frequency unit provided by Embodiment 1 of the present disclosure, where a first radio frequency module has 2 transmitting channels and 4 receiving channels, and a second radio frequency module has 1 transmitting channel and 2 receiving channels.

The second radio frequency module shown in FIG. 8 may still be a radio frequency module having 1 transmitting channel and 2 receiving channels, and ports TX1/RX1 and RX2 of the radio frequency channel in the second radio frequency module are connected to the combiner ports of the first radio frequency module respectively.

Figure 9:
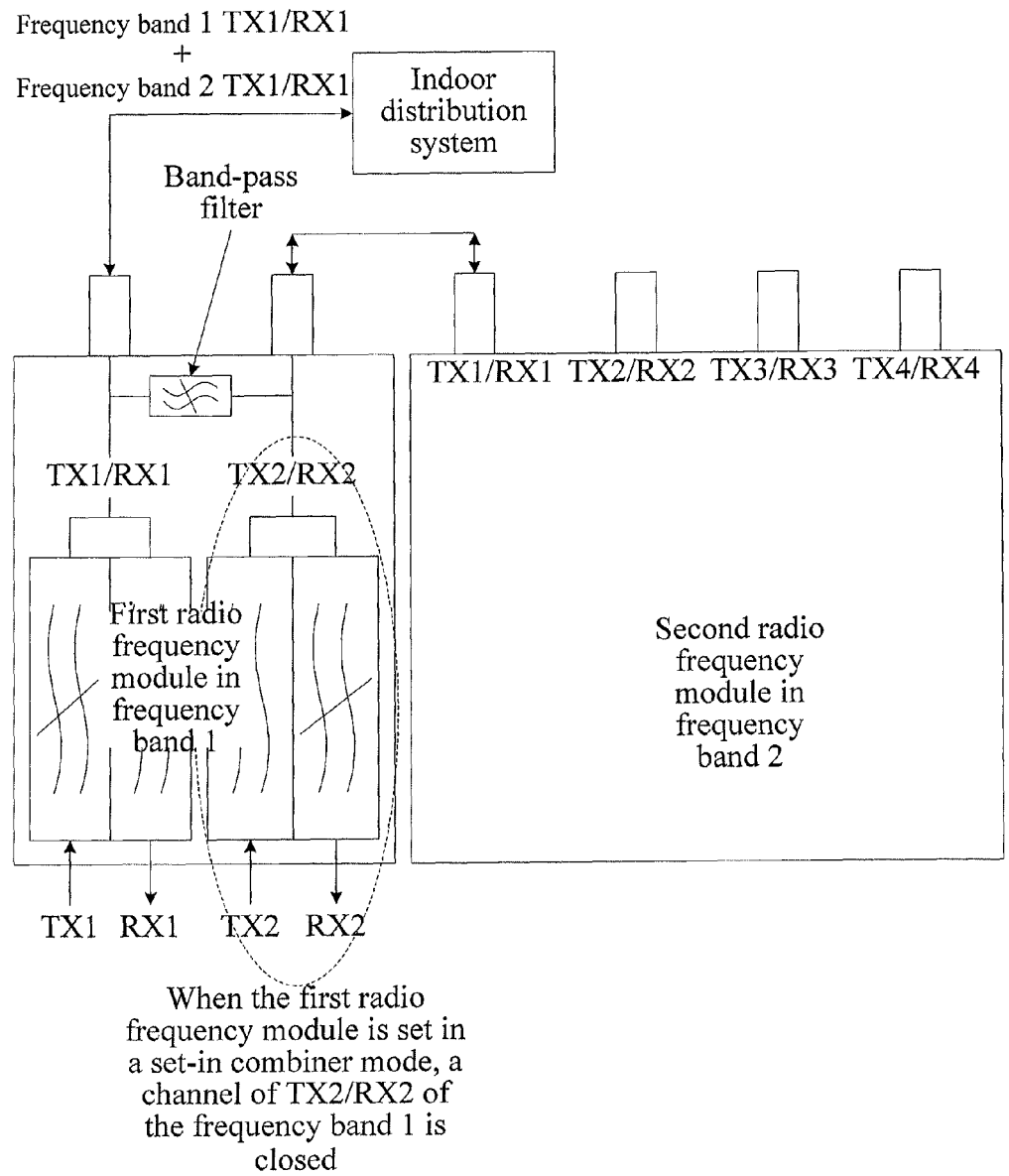
FIG. 9 is a schematic diagram of a base station radio frequency unit provided by Embodiment 1 of the present disclosure, where a first radio frequency module has 2 transmitting channels and 2 receiving channels, a second radio frequency module has 4 transmitting channels and 4 receiving channels, and the first radio frequency module is connected to an indoor distribution system.

As shown in FIG. 9, a first radio frequency module having 2 transmitting channels and 2 receiving channels and a second radio frequency module having 4 transmitting channels and 4 receiving channels are shown. A channel of TX2/RX2 of the first radio frequency module in the figure is closed. The port TX1/RX1 of the radio frequency channel serves as the combiner port, and is connected to TX1/RX1 of the second radio frequency module. The channel of TX1/RX1 of the first radio frequency module is in an enabled state, the port TX1/RX1 of the radio frequency channel of the second radio frequency module is connected to the combiner port through the band-pass filter, and TX1/RX1 of the first radio frequency module is connected to an indoor distribution system.

Figure 10:
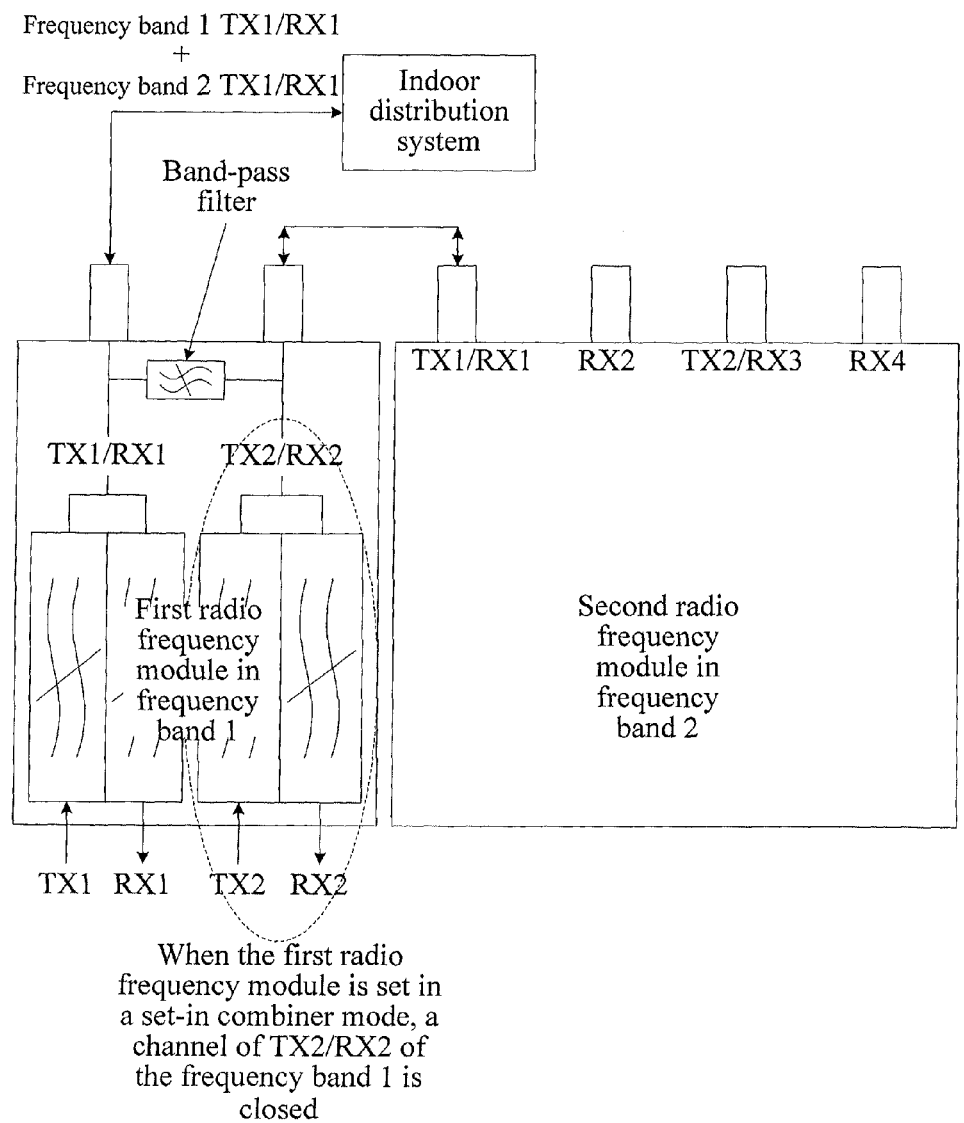
FIG. 10 is a schematic diagram of a base station radio frequency unit provided by Embodiment 1 of the present disclosure, where a first radio frequency module has 2 transmitting channels and 2 receiving channels, a second radio frequency module has 2 transmitting channels and 4 receiving channels, and the first radio frequency module is connected to an indoor distribution system.

When the port of the radio frequency channel of the first radio frequency module is connected to the indoor distribution system, as shown in FIG. 10, the second radio frequency module may also be a radio frequency module having 2 transmitting channels and 4 receiving channels.

Figure 11:
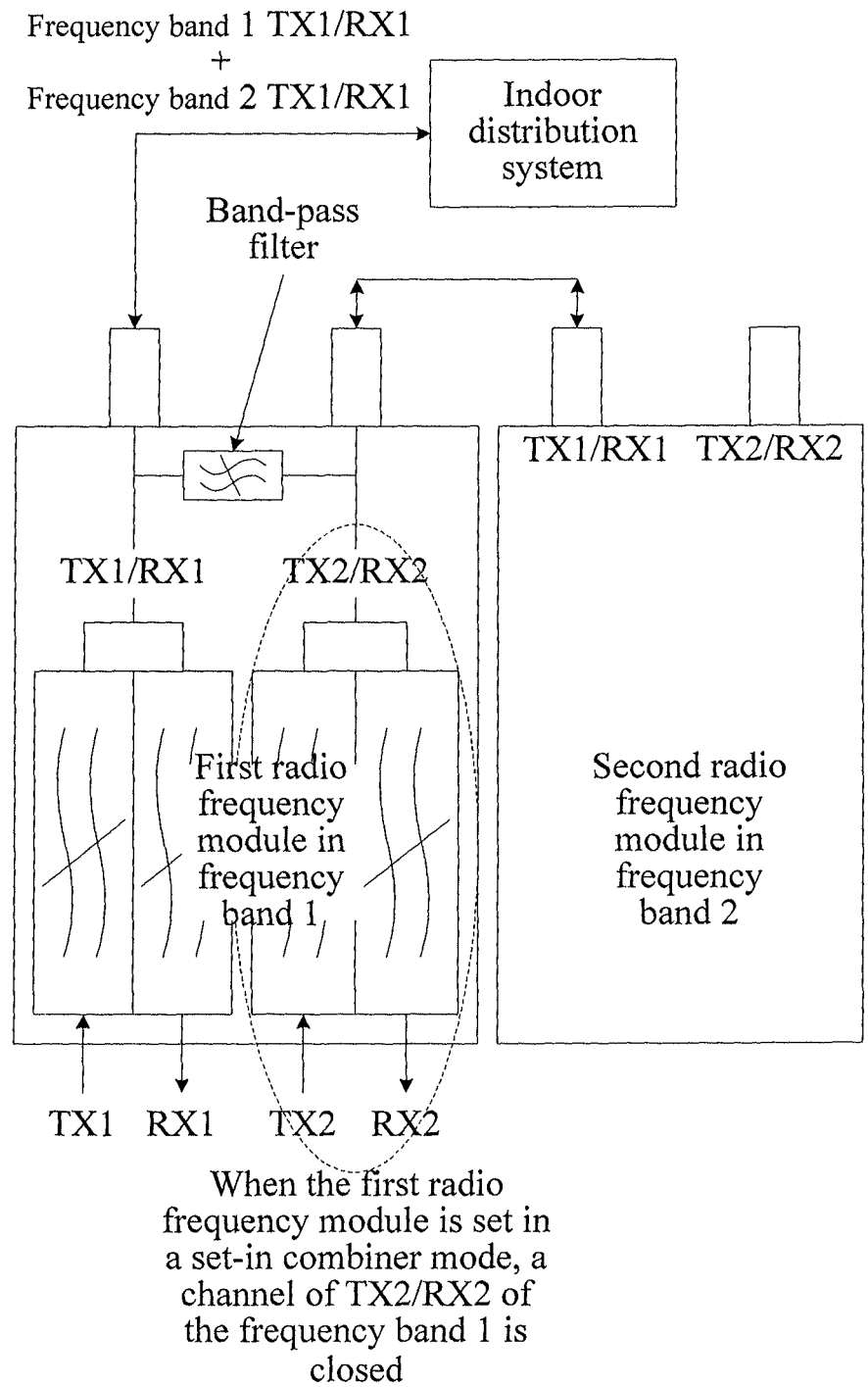
FIG. 11 is a schematic diagram of a base station radio frequency unit provided by Embodiment 1 of the present disclosure, where a first radio frequency module has 2 transmitting channels and 2 receiving channels, a second radio frequency module has 2 transmitting channels and 2 receiving channels, and the first radio frequency module is connected to an indoor distribution system.

When the port of the radio frequency channel of the first radio frequency module is connected to the indoor distribution system, as shown in FIG. 11, the second radio frequency module may also be a radio frequency module having 2 transmitting channels and 2 receiving channels.

Figure 12:
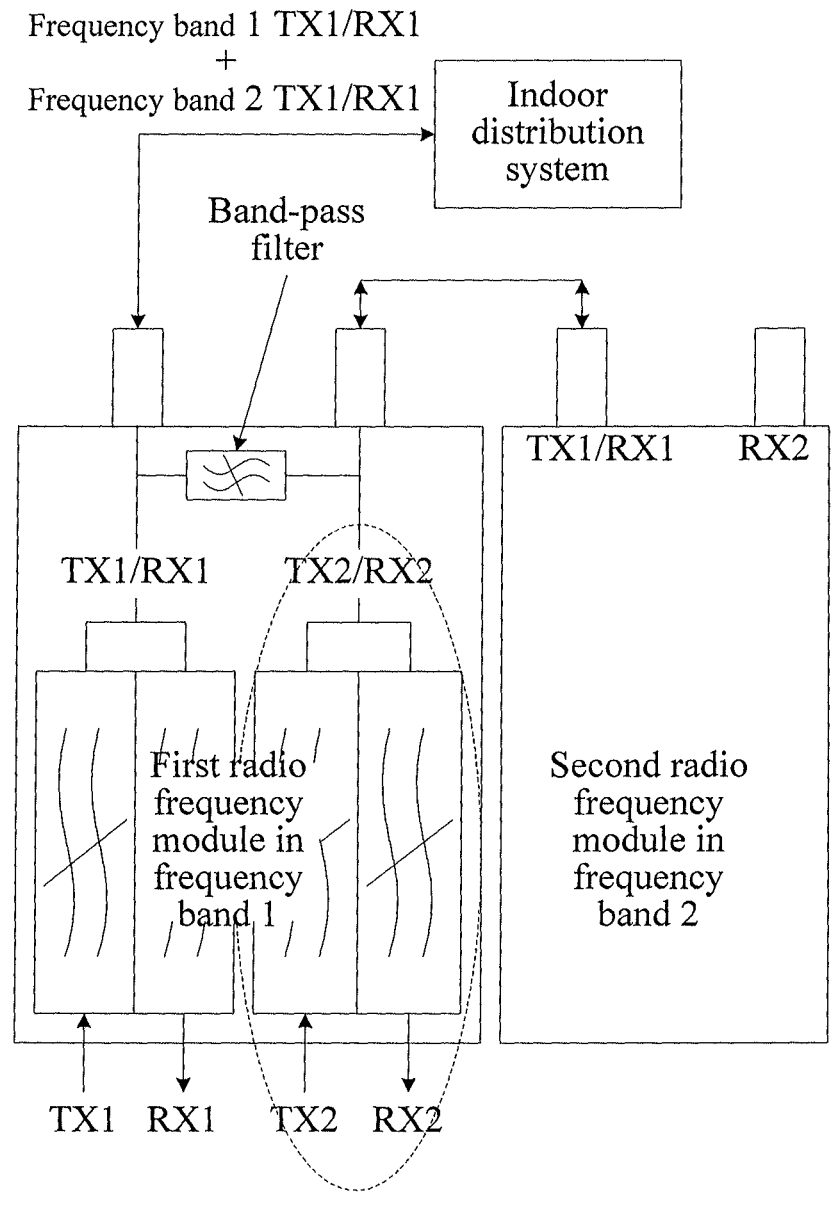
FIG. 12 is a schematic diagram of a base station radio frequency unit provided by Embodiment 1 of the present disclosure, where a first radio frequency module has 2 transmitting channels and 2 receiving channels, a second radio frequency module has 1 transmitting channel and 2 receiving channels, and the first radio frequency module is connected to an indoor distribution system.

When the port of the radio frequency channel of the first radio frequency module is connected to the indoor distribution system, as shown in FIG. 12, the second radio frequency module may also be a radio frequency module having 1 transmitting channel and 2 receiving channels.

Figure 13:
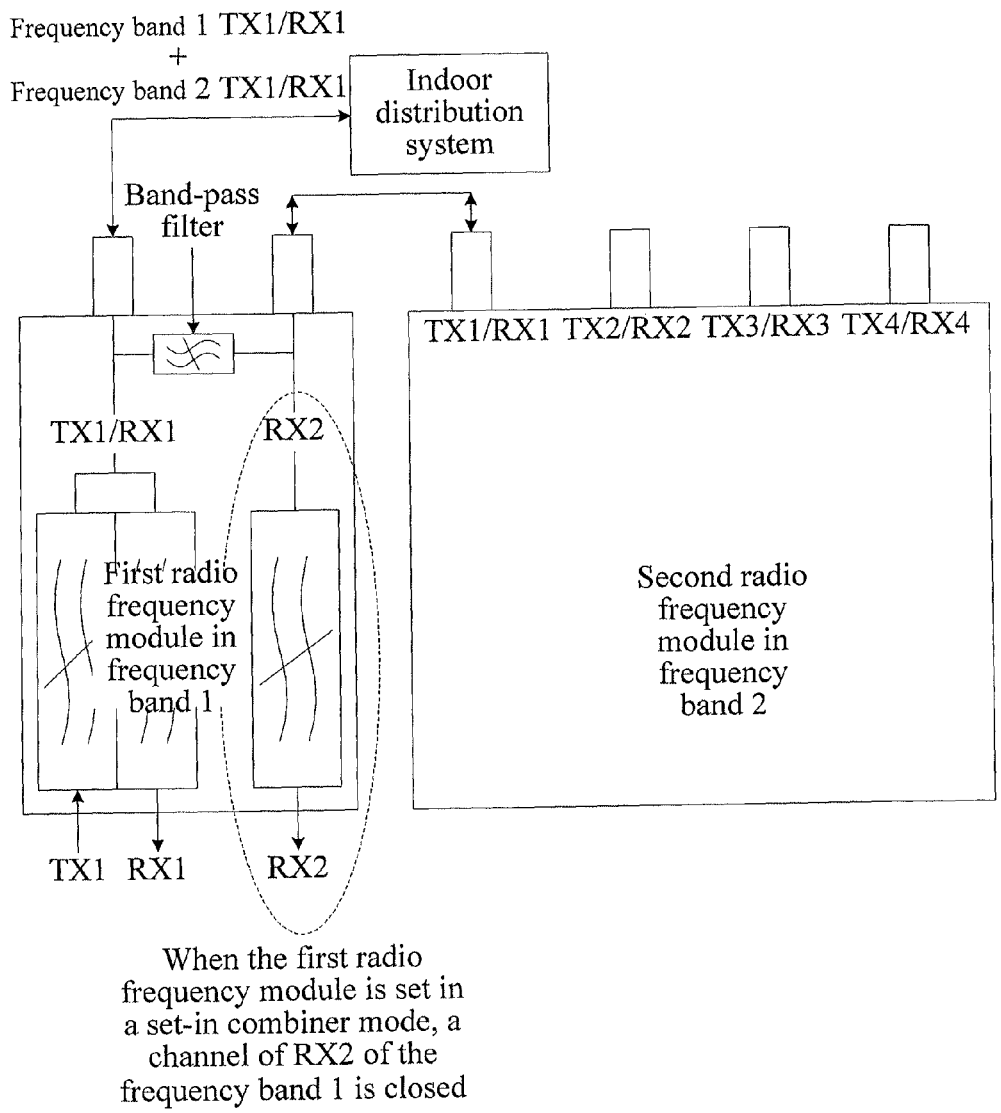
FIG. 13 is a schematic diagram of a base station radio frequency unit provided by Embodiment 1 of the present disclosure, where a first radio frequency module has 1 transmitting channel and 2 receiving channels, a second radio frequency module has 4 transmitting channels and 4 receiving channels, and the first radio frequency module is connected to an indoor distribution system.

When the port of the radio frequency channel of the first radio frequency module is connected to the indoor distribution system, as shown in FIG. 13, the first radio frequency module may also be a radio frequency module having 1 transmitting channel and 2 receiving channels, where RX2 of the first radio frequency module serves as the combiner port, and is connected to TX1/RX1 in a second radio frequency module having 4 transmitting channels and 4 receiving channels.

Figure 14:
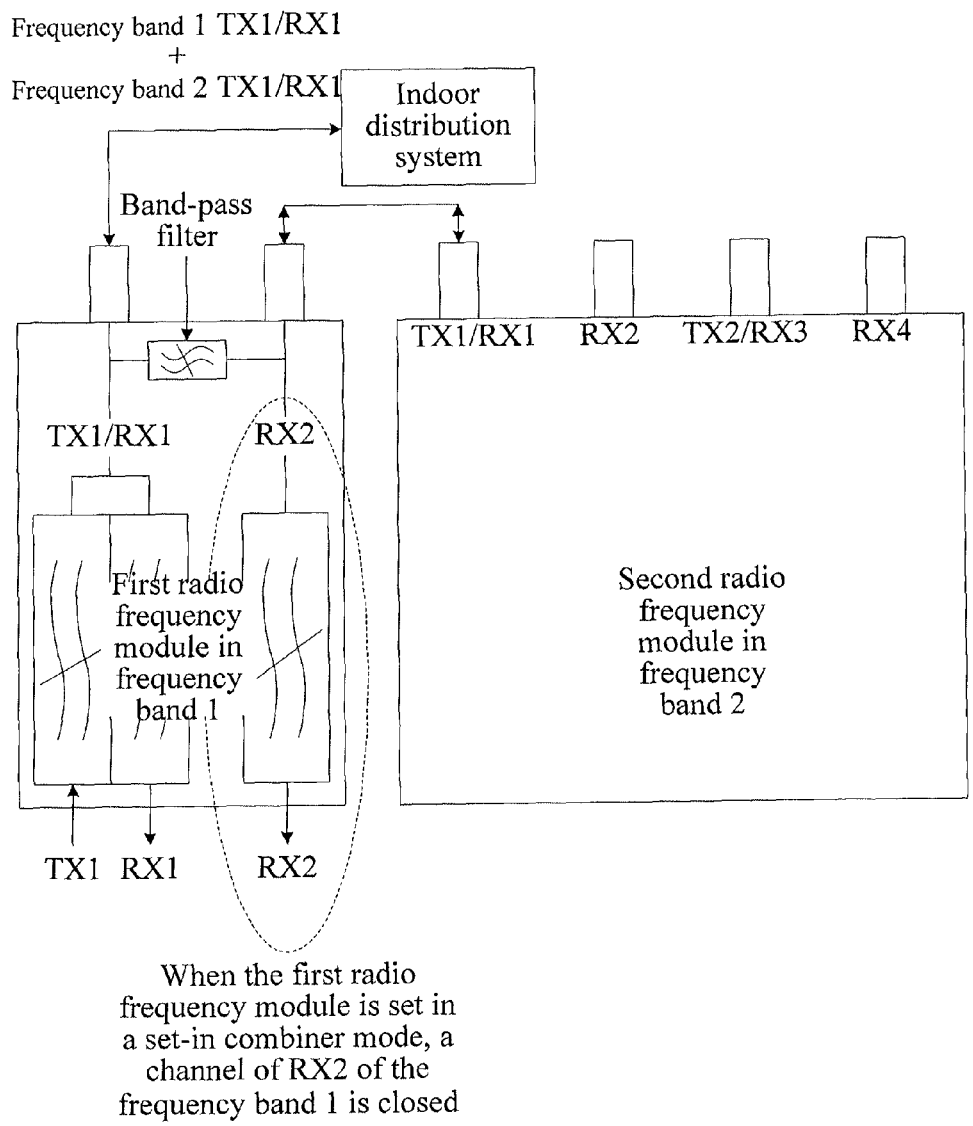
FIG. 14 is a schematic diagram of a base station radio frequency unit provided by Embodiment 1 of the present disclosure, where a first radio frequency module has 1 transmitting channel and 2 receiving channels, a second radio frequency module has 2 transmitting channels and 4 receiving channels, and the first radio frequency module is connected to an indoor distribution system.

When the port of the radio frequency channel of the first radio frequency module is connected to the indoor distribution system, as shown in FIG. 14, when the first radio frequency module is a radio frequency module having 1 transmitting channel and 2 receiving channels, the second radio frequency module may also be a radio frequency module having 2 transmitting channels and 4 receiving channels.

Figure 15:
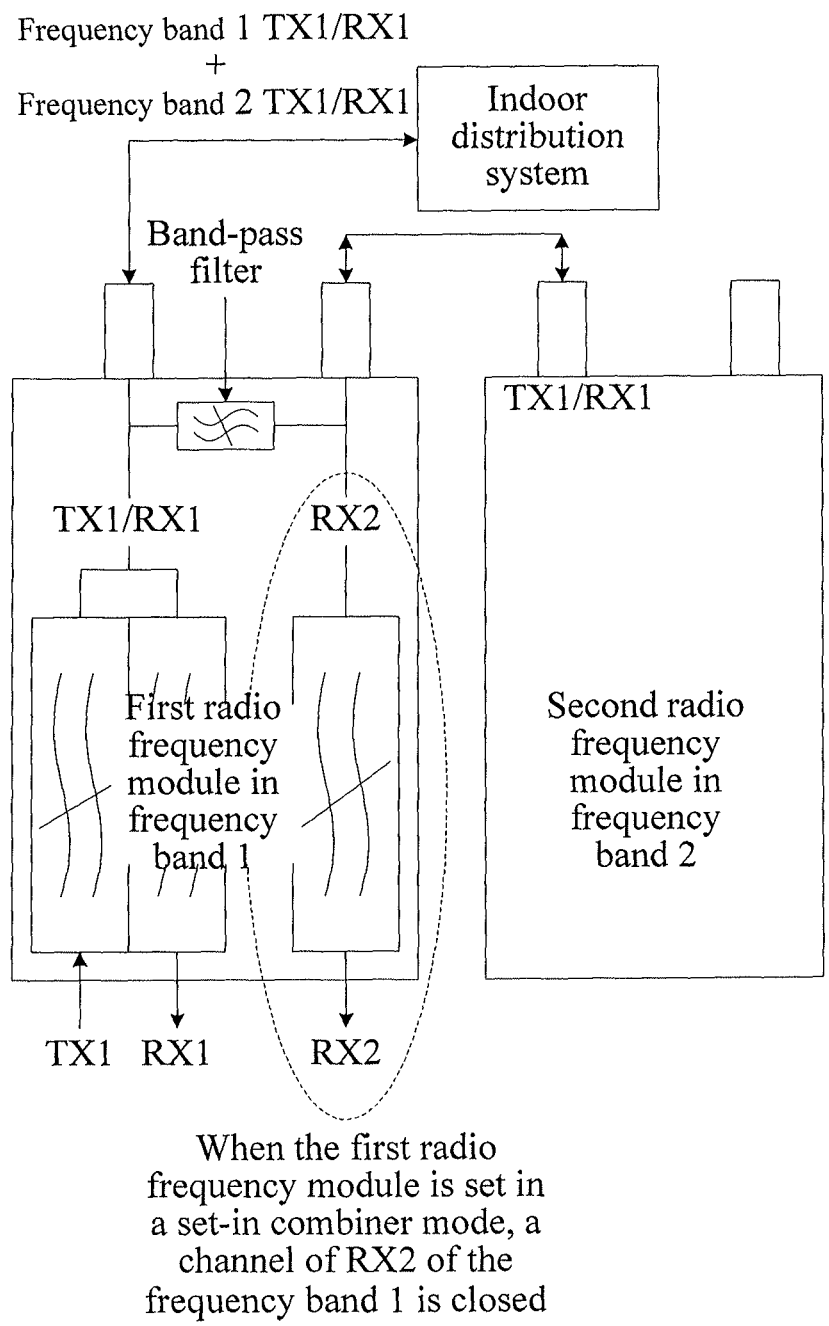
FIG. 15 is a schematic diagram of a base station radio frequency unit provided by Embodiment 1 of the present disclosure, where a first radio frequency module has 1 transmitting channel and 2 receiving channels, a second radio frequency module has 2 transmitting channels and 2 receiving channels, and the first radio frequency module is connected to an indoor distribution system.

When the port of the radio frequency channel of the first radio frequency module is connected to the indoor distribution system, as shown in FIG. 15, when the first radio frequency module is a radio frequency module having 1 transmitting channel and 2 receiving channels, the second radio frequency module may also be a radio frequency module having 2 transmitting channels and 2 receiving channels.

Figure 16:
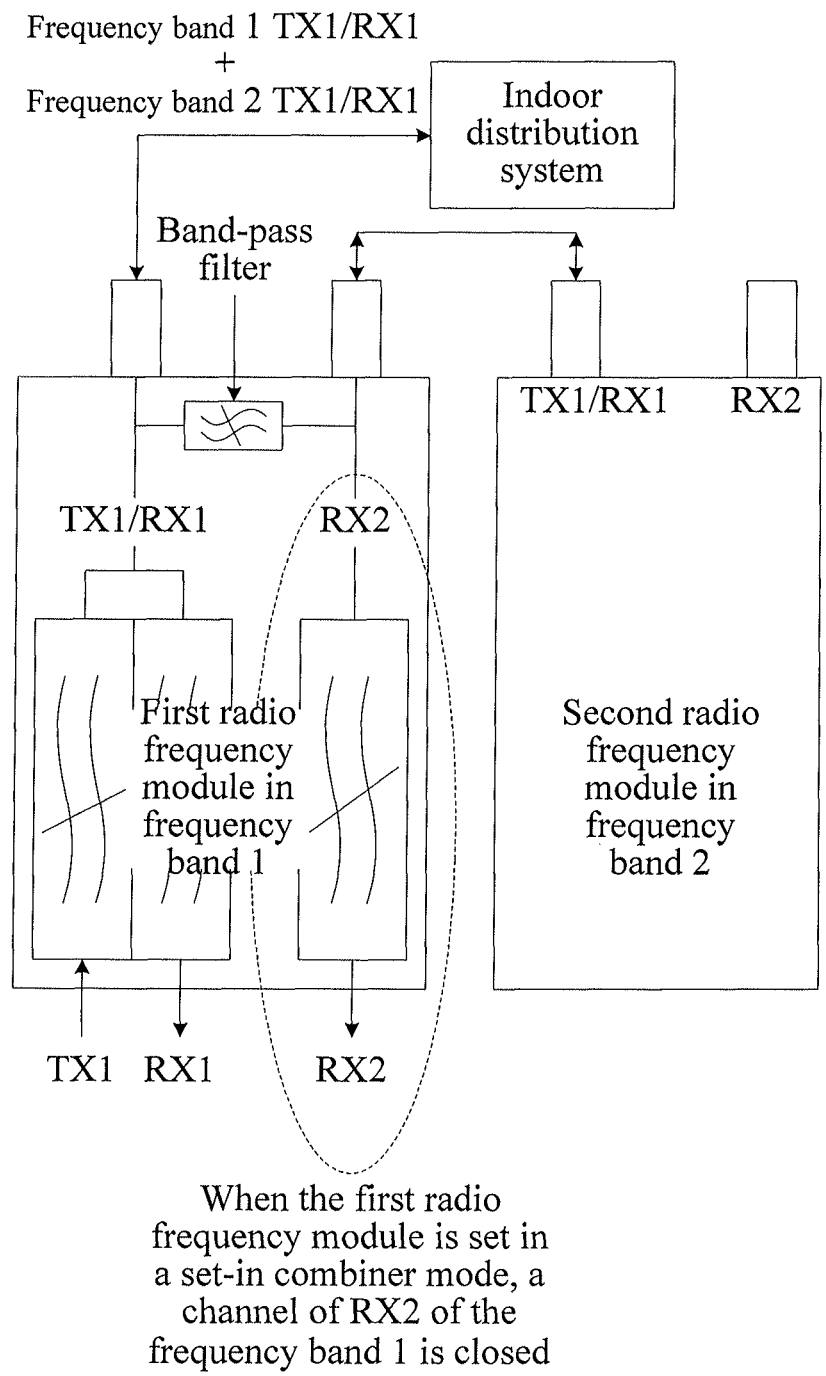
FIG. 16 is a schematic diagram of a base station radio frequency unit provided by Embodiment 1 of the present disclosure, where a first radio frequency module has 1 transmitting channel and 2 receiving channels, a second radio frequency module has 1 transmitting channel and 2 receiving channels, and the first radio frequency module is connected to an indoor distribution system.

When the port of the radio frequency channel of the first radio frequency module is connected to the indoor distribution system, as shown in FIG. 16, when the first radio frequency module is a radio frequency module having 1 transmitting channel and 2 receiving channels, the second radio frequency module may also be a radio frequency module having 1 transmitting channel and 2 receiving channels.

The present disclosure is suitable for combining between any radio frequency modules having multiple transmitting channels and multiple receiving channels or having a single transmitting channel and multiple receiving channels, and is not limited to the listed foregoing conditions. Any condition that the port of the radio frequency channel of the radio frequency module is used as the combiner port and to be connected to the port of the radio frequency channel of another radio frequency module falls within the present disclosure.

Embodiment 2

An embodiment of the present disclosure provides a multi-frequency band antenna feeder sharing method. As shown in FIG. 17, a first radio frequency module works in a frequency band 1, a second radio frequency module works in a frequency band 2, and specific operation steps include the following:

1701: When a first radio frequency module works in set-in combiner mode, the first radio frequency module receives, through an antenna feeder connected to a port of a first radio frequency channel, a signal of a frequency band 1 and a signal of a frequency band 2 from the port of the first radio frequency channel of the first radio frequency module, transmits the signals of the frequency band 1 and the frequency band 2 to a band-pass filter set in the first radio frequency module and filters the signals so as to obtain the signal of the frequency band 2, and transmits the signal of the frequency band 2 to a port of a third radio frequency channel of the second radio frequency module through a port of a second radio frequency channel serving as a combiner port in the first radio frequency module; and/or 1702: When the first radio frequency module works in set-in combiner mode, the second radio frequency module sends the signal of the frequency band 2 to the port of the second radio frequency channel serving as the combiner port in the first radio frequency module through the port of the third radio frequency channel of the second radio frequency module, transmits the signal of the frequency band 2 that has passed through the band-pass filter connected to the port of the second radio frequency channel to the port of the first radio frequency channel of the first radio frequency module, and sends out the signal of the frequency band 2, together with the signal of the frequency band 1, through an antenna feeder connected to the port of the first radio frequency channel.

In the multi-band antenna feeder sharing method provided by the embodiment of the present disclosure, the band-pass filter of the frequency band 2 is set in the radio frequency module of the frequency band 1, the combiner port and the port of the radio frequency channel in the radio frequency module are shared, thereby implementing antenna feeder sharing of two frequency bands. Embodiments of the present disclosure solve the problem of extra cost overhead brought by the dedicated combiner port that is set and port resources waste brought when the dedicated combiner port is idle in the prior art, simplify the design of the set-in module, reduce the cost overhead of the module, and improve the utilization rate of the port.

An embodiment of the present disclosure provides a multi-frequency band antenna feeder sharing method, further including:

when a first radio frequency module works in set-in combiner mode, receiving, through an indoor distribution system connected to a port of a first radio frequency channel, a signal of a frequency band 1 and a signal of a frequency band 2 from the port of the first radio frequency channel of the first radio frequency module, transmitting the signals of the frequency band 1 and the frequency band 2 to a band-pass filter set in the first radio frequency module and filtering the signals so as to obtain the signal of the frequency band 2, and transmitting the signal of the frequency band 2 to a port of a third radio frequency channel of a second radio frequency module through a port of a second radio frequency channel serving as a combiner port in the first radio frequency module; and/or when the first radio frequency module works in set-in combiner mode, sending, by the second radio frequency module, the signal of the frequency band 2 to the port of the second radio frequency channel serving as the combiner port in the first radio frequency module through the port of the third radio frequency channel of the second radio frequency module, transmitting the signal of the frequency band 2 that has passed through the band-pass filter connected to the port of the second radio frequency channel to the port of the first radio frequency channel of the first radio frequency module, and sending out the signal of the frequency band 2, together with the signal of the frequency band 1, through the indoor distribution system connected to the port of the first radio frequency channel.

In specific application, a worker sets the first radio frequency module to be in set-in combiner mode, the frequency band 2 and the frequency band 1 implement antenna feeder sharing through the combiner port and the band-pass filter.

As shown in FIG. 2, TX1/RX1 and TX3/RX3 ports of a first radio frequency module are shown. Signals of a frequency band 1 and a frequency band 2 are received through a antenna feeder. The signal of the frequency band 2 is obtained after the signals pass through a band-pass filter, and then the signal of the frequency band 2 is transmitted to the ports TX2/RX2 and TX1/RX1 of the radio frequency channel of a second radio frequency module through the combiner port. When the second radio frequency module sends the signal of the frequency band 2, the signal of the frequency band 2 is transmitted to the combiner port of the first radio frequency module through the ports TX2/RX2 and TX1/RX1 of the radio frequency channel of the second radio frequency module, the signal of the frequency band 2 passes through the band-pass filter, and then the signal of the frequency band 2 is sent out, together with the signal of the frequency band 1, via TX1/RX1 and TX3/RX3 ports of the first radio frequency module by using the antenna feeder.

Signal receiving and sending conditions in FIG. 3 to FIG. 8 are similar to that in FIG. 2, and the only difference lies in the selected radio frequency modules.

The first radio frequency module may also be connected to an indoor distribution system, so as to receive and send a signal. As shown in FIG. 9 to FIG. 16, the port of the radio frequency channel, which is in an enabled state, in a receiving and sending channel in the first radio frequency module, is connected to the indoor distribution system, and performs receiving and sending of signals of the frequency band 1 and the frequency band 2.

The present disclosure may be applied to all multi-frequency band site sharing, and the first radio frequency module and the second radio frequency module may be applied to any two signal frequency bands in multiple frequency bands.

A radio frequency module is provided, which includes:
a band-pass filter, set between a port of a first radio frequency channel and a port of a second radio frequency channel in a radio frequency module; where
the band-pass filter is set in the base station radio frequency module.

The port of the first radio frequency channel in the radio frequency module is connected to an antenna feeder or an indoor distribution system.

A base station radio frequency unit is provided, which includes:
a first radio frequency module and a second radio frequency module, where a port of the second radio frequency channel serving as a combiner port in the first radio frequency module is connected to a port of a third radio frequency channel in the second radio frequency module.

A multi-frequency band antenna feeder sharing method is provided, where a first radio frequency module works in a frequency band 1, a second radio frequency module works in a frequency band 2, and the method includes:

when a first radio frequency module works in set-in combiner mode, receiving, through an antenna feeder connected to a port of a first radio frequency channel, a signal of a frequency band 1 and a signal of a frequency band 2 from a port of the first radio frequency channel of the first radio frequency module, transmitting the signals of the frequency band 1 and the frequency band 2 to a band-pass filter set in the first radio frequency module and filtering the signals so as to obtain the signal of the frequency band 2, and transmitting the signal of the frequency band 2 to a port of a third radio frequency channel of the second radio frequency module through a port of a second radio frequency channel serving as a combiner port in the first radio frequency module; and/or when the first radio frequency module works in set-in combiner mode, sending, by the second radio frequency module, the signal of the frequency band 2 to the port of the second radio frequency channel serving as the combiner port in the first radio frequency module through the port of the third radio frequency channel of the second radio frequency module, transmitting the signal of the frequency band 2 that has passed through the band-pass filter connected to the port of the second radio frequency channel to the port of the first radio frequency channel of the first radio frequency module, and sending out the signal of the frequency band 2, together with the signal of the frequency band 1, through an antenna feeder connected to the port of the first radio frequency channel.

The multi-frequency band antenna feeder sharing method further includes:

when the first radio frequency module works in set-in combiner mode, receiving, through an indoor distribution system connected to the port of the first radio frequency channel, signals of the frequency band 1 and the frequency band 2 from the port of the first radio frequency channel of the first radio frequency module, transmitting the signals of the frequency band 1 and the frequency band 2 to the band-pass filter set in the first radio frequency module and filtering the signals so as to obtain the signal of the frequency band 2, and transmitting the signal of the frequency band 2 to the port of the third radio frequency channel of the second radio frequency module through the port of the second radio frequency channel serving as the combiner port in the first radio frequency module; and/or when the first radio frequency module works in set-in combiner mode, sending, by the second radio frequency module, the signal of the frequency band 2 to the port of the second radio frequency channel serving as the combiner port in the first radio frequency module through the port of the third radio frequency channel of the second radio frequency module, transmitting the signal of the frequency band 2 that has passed through the band-pass filter connected to the port of the second radio frequency channel to the port of the first radio frequency channel of the first radio frequency module, and sending out the signal of the frequency band 2, together with the signal of the frequency band 1, through the indoor distribution system connected to the port of the first radio frequency channel.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

What is claimed is:

1. A base station, comprising:
   a first radio frequency module and a second radio frequency module, the first radio frequency module comprising a first plurality of ports and the second radio frequency module comprising a second plurality of ports, wherein each port of the first radio frequency module is connected with a different radio frequency channel in the first radio frequency module, and wherein a port of a second radio frequency channel serving as a combiner port in the first radio frequency module is connected to a port of a third radio frequency channel in the second radio frequency module.

2. A base station multi-frequency band antenna feeder sharing method, wherein the base station comprising a first radio frequency module which works in a frequency band 1, and a second radio frequency module which works in a frequency band 2, the first radio frequency module comprising a first plurality of ports and the second radio frequency module comprising a second plurality of ports, the method comprising at least one of the following:
   when the first radio frequency module works in set-in combiner mode, receiving, through an antenna feeder connected to a port of a first radio frequency channel, a signal of a frequency band 1 and a signal of a frequency band 2 from the port of the first radio frequency channel of the first radio frequency module, transmitting the signals of the frequency band 1 and the frequency band 2 to a band-pass filter set in the first radio frequency module and filtering the signals so as to obtain the signal of the frequency band 2, and transmitting the signal of the frequency band 2 to a port of a third radio frequency channel of the second radio frequency module through a port of a second radio frequency channel serving as a combiner port in the first radio frequency module; and
   when the first radio frequency module works in set-in combiner mode, sending, by the second radio frequency module, the signal of the frequency band 2 to the port of the second radio frequency channel serving as the combiner port in the first radio frequency module through the port of the third radio frequency channel of the second radio frequency module, transmitting the signal of the frequency band 2 that has passed through the band-pass filter connected to the port of the second radio frequency channel to the port of the first radio frequency channel of the first radio frequency module, and sending out the signal of the frequency band 2, together with the signal of the frequency band 1, through the antenna feeder connected to the port of the first radio frequency channel.

3. The multi-frequency band antenna feeder sharing method according to claim 2, further comprising at least one of the following:
   when the first radio frequency module works in set-in combiner mode, receiving, through an indoor distribution system connected to the port of the first radio frequency channel, the signals of the frequency band 1 and the frequency band 2 from the port of the first radio frequency channel of the first radio frequency module, transmitting the signals of the frequency band 1 and the frequency band 2 to the band-pass filter set in the first radio frequency module and filtering the signals so as to obtain the signal of the frequency band 2, and transmitting the signal of the frequency band 2 to the port of the third radio frequency channel of the second radio frequency module through the port of the second radio frequency channel serving as the combiner port in the first radio frequency module; and when the first radio frequency module works in set-in combiner mode, sending, by the second radio frequency module, the signal of the frequency band 2 to the port of the second radio frequency channel serving as the combiner port in the first radio frequency module through the port of the third radio frequency channel of the second radio frequency module, transmitting the signal of the frequency band 2 that has passed through the band-pass filter connected to the port of the second radio frequency channel to the port of the first radio frequency channel of the first radio frequency module, and sending out the signal of the frequency band 2, together with the signal of the frequency band 1, through the indoor distribution system connected to the port of the first radio frequency channel.

4. The base station according to claim 1, comprising:
a band-pass filter, set between a port of a first radio frequency channel and a port of a second radio frequency channel in the first radio frequency module.

5. The base station according to claim 4, wherein the port of the first radio frequency channel is connected to an antenna feeder or an indoor distribution system.

6. The base station according to claim 1, wherein the port of the second radio frequency channel in the first radio frequency module works as a sending and receiving port in a first mode and works as the combiner port in a set-in combiner mode.

7. The base station according to claim 1, wherein the base station is configured to:
receive, through an antenna feeder connected to a port of a first radio frequency channel, a signal of a first frequency band and a signal of a second frequency band from the port of the first radio frequency channel of the first radio frequency module;
transmit the signals of the first frequency band and the second frequency band to a band-pass filter set in the first radio frequency module and filtering the signals so as to obtain the signal of the second frequency band; and
transmit the signal of the second frequency band to a port of a third radio frequency channel of the second radio frequency module through a port of a second radio frequency channel serving as the combiner port in the first radio frequency module.

8. The base station according to claim 7, wherein the base station is configured to:
send, by the second radio frequency module, the signal of the second frequency band to the port of the second radio frequency channel serving as the combiner port in the first radio frequency module through the port of the third radio frequency channel of the second radio frequency module;
transmit the signal of the second frequency band that has passed through the band-pass filter connected to the port of the second radio frequency channel to the port of the first radio frequency channel of the first radio frequency module, and
send out the signal of the second frequency band, together with the signal of the frequency band 1, through the antenna feeder connected to the port of the first radio frequency channel.

* * * * *